(12) United States Patent
Dequin et al.

(10) Patent No.: US 6,290,171 B1
(45) Date of Patent: Sep. 18, 2001

(54) DEVICE FOR CONTROLLING A HELICOPTER HYBRID COUNTERTORQUE SYSTEM

(75) Inventors: André-Michel Dequin, Aix-en-Provence; Valery Lionel Delisle, Pourrieres, both of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/167,613

(22) Filed: Oct. 6, 1998

(30) Foreign Application Priority Data

Oct. 7, 1997 (FR) ................................................. 97 12454

(51) Int. Cl.[7] ............................................. B64C 27/82
(52) U.S. Cl. ........................................ 244/17.19; 244/7 R
(58) Field of Search ............................. 244/17.19, 17.11, 244/17.13, 17.21, 7 R, 6, 7 A, 7 B

(56) References Cited

U.S. PATENT DOCUMENTS

| | | | |
|---|---|---|---|
| 2,818,224 | 12/1957 | Sikorsky | 244/17.19 |
| 3,332,643 | * 7/1967 | Toner | 244/17.21 |
| 3,404,737 | * 10/1968 | Keder, Jr. | 244/17.19 |
| 3,464,651 | * 9/1969 | Lightfoot | 244/6 |
| 3,833,188 | * 9/1974 | Robinson | 244/17.19 |
| 5,388,785 | * 2/1995 | Rollet et al. | 244/17.19 |
| 5,607,122 | * 3/1997 | Hicks et al. | 244/17.21 |
| 6,053,452 | * 4/2000 | Yamakawa et al. | 244/17.19 |

FOREIGN PATENT DOCUMENTS

| | | |
|---|---|---|
| 0 566 452 A1 | 10/1993 | (EP) . |
| 2 167 249 | 8/1973 | (FR) . |
| 2 338 845 | 8/1977 | (FR) . |

OTHER PUBLICATIONS

French Search Report dated Jun. 18, 1998, 3 pages.

* cited by examiner

*Primary Examiner*—Galen L. Barefoot
(74) *Attorney, Agent, or Firm*—Marshall, Gerstein & Borun

(57) ABSTRACT

The present invention relates to a device (1A) for controlling a hybrid countertorque system of a helicopter (He), which comprises a countertorque rotor (R2), and at least one aerodynamic steering surface (D).

According to the invention, said device comprises means (1A) for controlling, as a matter of priority, the aerodynamic surface (D) so that it generates lift which represents at least part of a first control command, which can be executed by said surface (D), and to control the countertorque rotor (R2) in such a way that the combined action of the surface (D) and of the rotor (R2) represents a command for controlling the helicopter (He) in terms of yaw.

13 Claims, 4 Drawing Sheets

DEVICE FOR CONTROLLING A HELICOPTER HYBRID COUNTERTORQUE SYSTEM

BACKGROUND OF THE INVENTION

The present invention relates to a device for controlling a helicopter hybrid countertorque system, said hybrid countertorque system comprising a countertorque rotor associated with at least one turnable aerodynamic steering surface, such as a fin flap or a fin which is fully turnable. It also relates to a helicopter equipped with such a control device.

It is known that in a helicopter equipped with a single main rotor providing lift and propulsion, the fuselage tends, as a reaction to the torque exerted by said main rotor, to turn in the opposite direction to the direction of rotation of the latter. It is also known that in order to combat the reaction torque to which the fuselage is subjected, it is conventional to provide an auxiliary countertorque rotor capable of generating a transverse thrust and the rotation of which is driven off the source of motive power of the main rotor. Thus, the auxiliary countertorque rotor taps off some of the power from this power source.

This therefore means that, as far as helicopter performance is concerned, it is advantageous for the auxiliary countertorque rotor to be assisted in its function of providing the fuselage with countertorque lateral stabilization.

DESCRIPTION OF THE PRIOR ART

As is mentioned, for example, in patent U.S. Pat. No. 2,818,224, it is possible, to these ends, to unload said countertorque rotor in translational flight, using an aerodynamic thrust exerted on a fin provided toward the tail of said helicopter. Such thrust is usually obtained by choosing a cambered profile for the fin and by setting this fin at a certain angle with respect to the plane of symmetry of the fuselage. However, for a fixed design of fin, the thrust thus obtained when the helicopter is flying with zero yaw depends only on the dynamic pressure of the air on the fin and can therefore not be altered. As the countertorque force to be exerted varies differently as a function of the speed, and as a function of other flight parameters, this means that optimum unloading of the countertorque rotor is, in practice, possible only in one single flight scenario.

To avoid the drawbacks and limitations that arise in using such a fixed unloading fin, it is possible to employ a fin flap, the orientation of which is adjustable.

As regards the way in which such a fin flap is controlled, there are various so-called deterministic concepts of control law, that is to say ones which cause a turning of the fin flap as a function of known flight-scenario parameters and which is adapted to the desired objective (according to an awareness model) This type of control, although attractive in principle, is, by nature, not well able to withstand changes to the external aerodynamics (carriage of external stores for example) and requires in-flight optimization if the awareness model proves imprecise.

It will also be noted that another drawback of a countertorque rotor lies in its induced drag, which may reach as much as half of the thrust at high speeds, and in the induced noise which is liable to be very troublesome.

SUMMARY OF THE INVENTION

The object of the present invention is to overcome these drawbacks. The invention relates to a device for controlling a helicopter hybrid countertorque system which makes it possible to reduce the thrust of the countertorque rotor (and therefore improve the helicopter performance and/or reduce the cost of the flight), and the induced noise and drag, and which in addition makes it possible to keep authority for controlling the helicopter in terms of yaw at all points in the flight envelope.

To this end, according to the invention, said device for controlling a hybrid countertorque system is intended to counteract the torque induced by a main rotor providing a helicopter with forward propulsion and with lift, and which comprises:

an auxiliary countertorque rotor which is controllable and exerts a lateral countertorque thrust; and at least one aerodynamic steering surface which is controllable and generates transverse countertorque lift, is noteworthy in that it comprises control means:

for controlling, as a matter of priority, said aerodynamic surface so that it generates lift which represents at least part of a first control command, which part can be executed by said aerodynamic surface; and for controlling said auxiliary rotor in such a way that the combined action of said aerodynamic surface and said auxiliary rotor represents a command for controlling the helicopter in terms of yaw.

Thus, by virtue of the priority control over said aerodynamic surface, preferably a fin flap or an entirely turnable fin, the device in accordance with the invention makes it possible to cancel or at the very least minimize the thrust of the auxiliary rotor, while at the same time exerting the required control in terms of yaw, this making it possible to reduce the induced noise and drag and to improve the helicopter performance.

In addition, the invention makes it possible to keep, or even to improve, the authority of the control of the helicopter in terms of yaw, at all points in the flight envelope.

Incidentally, said first control command corresponds, according to the invention:

either also to said helicopter yaw control command, which means as a consequence, when said aerodynamic surface is capable of executing said first control command in full, that in equilibrium, all of the countertorque action is provided by said aerodynamic surface and that said auxiliary rotor then exerts zero thrust;

or to an order which is determined on the basis of the difference between said yaw control command and a reference command that represents reference control of said auxiliary rotor, so that in equilibrium, said auxiliary rotor exerts a thrust that represents said reference control. Of course, if said reference control corresponds to the control that generates zero thrust, this again amounts to the previous scenario (the auxiliary rotor exerts no thrust and all of the countertorque action is exerted by the aerodynamic surface).

Furthermore, according to the invention, said yaw control command may:

either represent the action exerted by a pilot of the helicopter on a rudder bar, which allows the device in accordance with the invention to be fitted to a conventional helicopter with a mechanical flight-control system;

or be determined by a calculation unit, on the basis of the actions exerted respectively on a collective stick and on a rudder bar by at least one pilot of the helicopter. Said calculation unit may, in particular, correspond to a fly-by-wire control system.

In a first advantageous embodiment of the invention, which is an essentially mechanical embodiment, applied to a helicopter comprising at least one rudder bar for controlling the helicopter in terms of yaw and a linkage connected to said rudder bar and to a member for operating the auxiliary rotor, said control means advantageously comprise a bellcrank with two branches, incorporated into said linkage and intended to split the movement of the linkage between said branches so that it can be transmitted, a first of which branches is connected mechanically to a member for operating the aerodynamic surface, and the second of which branches is mechanically connected to the member for operating the auxiliary rotor, the mechanical link between said second branch and said member for operating the auxiliary rotor being elastically constrained.

In this case, said elastic constraint advantageously has a neutral point which is adjustable.

It will be noted that an appreciable loss in control responsiveness at low speeds may occur, with the appearance of a dead control range.

To overcome this problem, the present invention presents a number of different solutions.

In a first solution, adjustable stops which limit the movement of the mechanical link between the first branch of the bellcrank and the member for operating the aerodynamic surface are provided.

Preferably, means for adjusting said stops as a function of the helicopter speed are also provided in order to greatly limit or even completely prevent the turning of the aerodynamic surface at low speed so that only the auxiliary rotor is then controlled.

In a second solution, a damper connected to the mechanical link between the first branch of the bellcrank and the member for operating the aerodynamic surface is provided.

Furthermore, in a second advantageous embodiment of the invention, which is a basically electrical embodiment, said control means comprise a calculation unit which determines, on the one hand, a second control command transmitted to a member for operating the aerodynamic surface in order to control the latter and, on the other hand, a third control command transmitted to a member for operating the auxiliary rotor, to control the latter.

This second embodiment is particularly robust as far as variations in the external aerodynamic configuration of the helicopter are concerned, and furthermore requires only a small amount of in-flight optimization.

Furthermore, said calculation unit advantageously performs:

a conversion between said control commands intended respectively for said aerodynamic surface and for said auxiliary rotor, using a yaw-moment effectiveness conversion gain; and/or low-pass filtering of said second control command.

Furthermore, the device in accordance with the invention advantageously comprises means for measuring the turning angle of the aerodynamic surface, the angle thus measured being transmitted to said calculation unit to determine said third control command.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENTS

Figure 1:
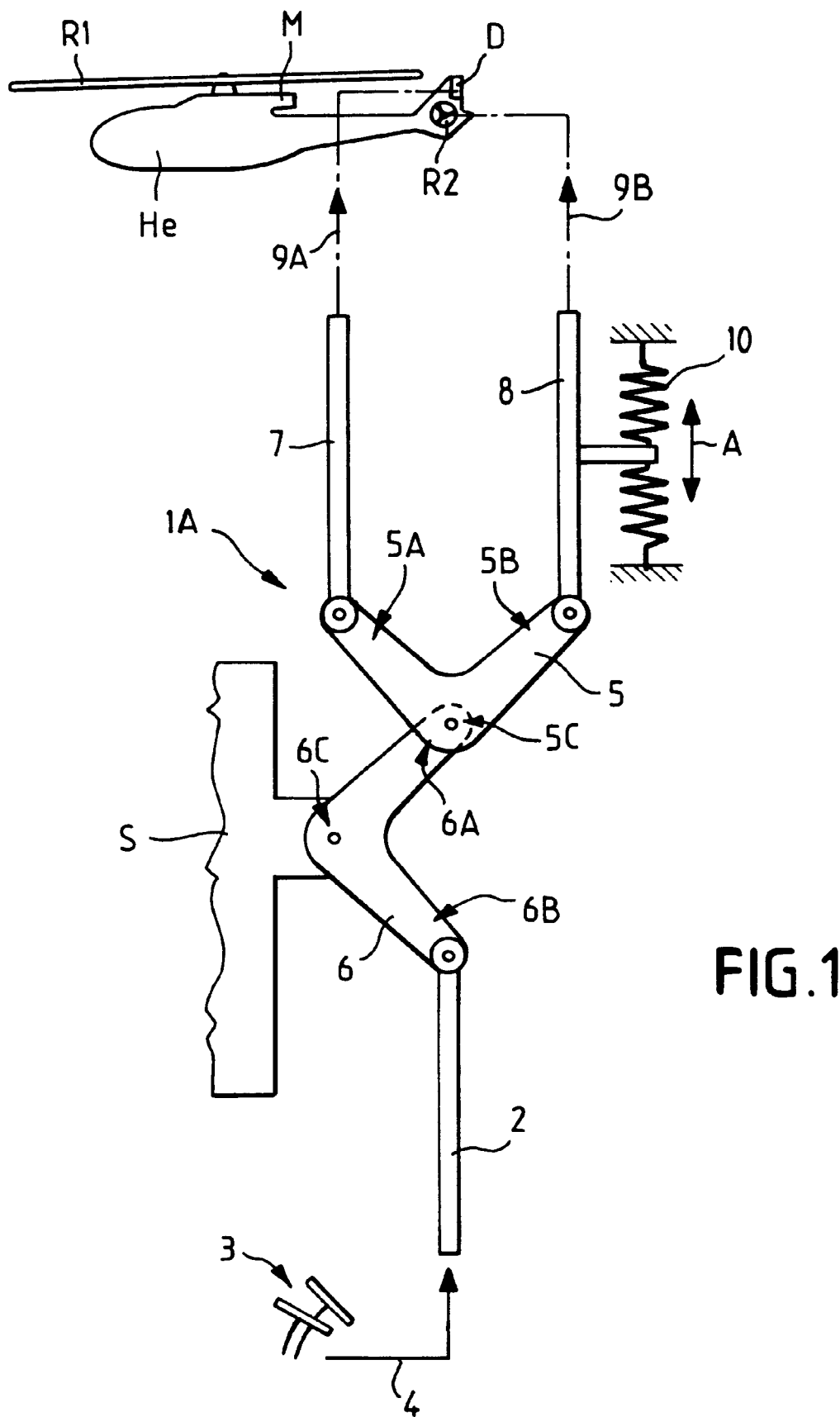
FIG. 1 diagrammatically shows a control device in accordance with the invention, in a first embodiment.
Figure 5:
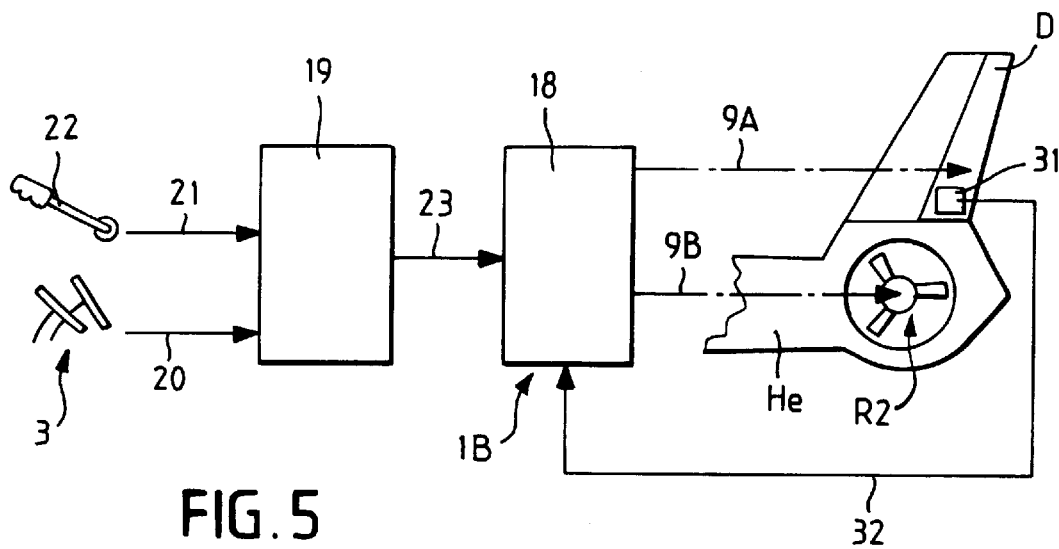
FIG. 5 illustrates diagrammatically a control device in accordance with the invention, in a second embodiment.

The control device in accordance with the invention and depicted diagrammatically in FIGS. 1 and 5, in two different embodiments 1A and 1B respectively, is applied to a helicopter He equipped with a single main rotor R1 providing forward propulsion and lift.

Said control device 1A or 1B is intended to control a hybrid countertorque system of said helicopter He, the purpose of which is to counteract the torque induced by said main motor R1 and which comprises:

an auxiliary countertorque rotor R2 which is controllable and exerts a lateral countertorque thrust, not depicted; and at least one aerodynamic steering surface, illustrated in the form of a fin flap D, controllable in terms of orientation and generating a transverse countertorque lift, likewise not depicted.

Said control device 1A, 1B is intended, in particular, to reduce the thrust of said auxiliary rotor R2 so as to improve the performance of the helicopter He, because the rotation of said auxiliary rotor R2 is driven by the motive power unit M that drives said main motor R1.

The present invention also has many other advantages specified hereinbelow.

In the embodiment illustrated in FIG. 1, the invention is applied to a helicopter He depicted diagrammatically on a smaller scale to make the drawing clearer and comprising a linkage 2 controlled by a pilot, not depicted, of said helicopter He operating a rudder bar 3, as indicated by an arrow 4.

As is known, said linkage 2 is connected to at least one member, not depicted, for operating the blades of the rotor R2, to transmit to it the command for controlling the helicopter He in terms of yaw, this command being generated by the operating of said rudder bar 3.

To obtain the desired characteristics and advantages, said device 1A comprises control means which comprise, in particular, a bellcrank 5 specified hereinbelow, and which are formed in such a way that they:

control, as a matter of priority, said fin flap D so that it, generates lift which represents at least part of the yaw control command generated by operating the rudder bar 3, which part of the command can be executed by said fin flap D; and control said auxiliary rotor R2 in such a way that the combined action of said fin flap D and of said auxiliary rotor R2 represents said yaw control command.

Thus, the priority control of the fin flap D, which holds true for all phases of forward flight, as will be seen hereinbelow, ensures that the countertorque contribution from the rotor R2 is minimal. It is even zero when the fin flap D can execute all of the corresponding control command.

This then makes it possible to relieve the rotor R2, to improve the performance of the helicopter He, and to reduce the noise and drag induced by the thrust of said rotor R2.

As can be seen from FIG. 1, the bellcrank 5, which has two branches 5A and 5B, is articulated at its center 5C to one branch 6A of another bellcrank 6, the other branch 6B of which is articulated to the linkage 2, and which is connected at its center 6C to the structure S of the helicopter He.

The branch 5A is connected to a link rod 7 capable of controlling a member, not depicted, for operating the fin flap D, as illustrated by an arrow 9A.

As for the branch 5B of the bellcrank 5, it is connected to a link rod 8 capable of controlling a member, not depicted, for operating the blades of the rotor R2, as illustrated by an arrow 9B.

Furthermore, the link rod 8 is connected to a spring 10, the neutral point of which can be adjusted as illustrated by a double-headed arrow A and preferably corresponds to the zero-thrust pitch of the rotor R2.

Furthermore, the length of the branches 5A and 5B of the bellcrank 5 can be altered and allows the respective sensitivities of the rotor R2 and of the fin flap D to be adjusted.

Figure 2:
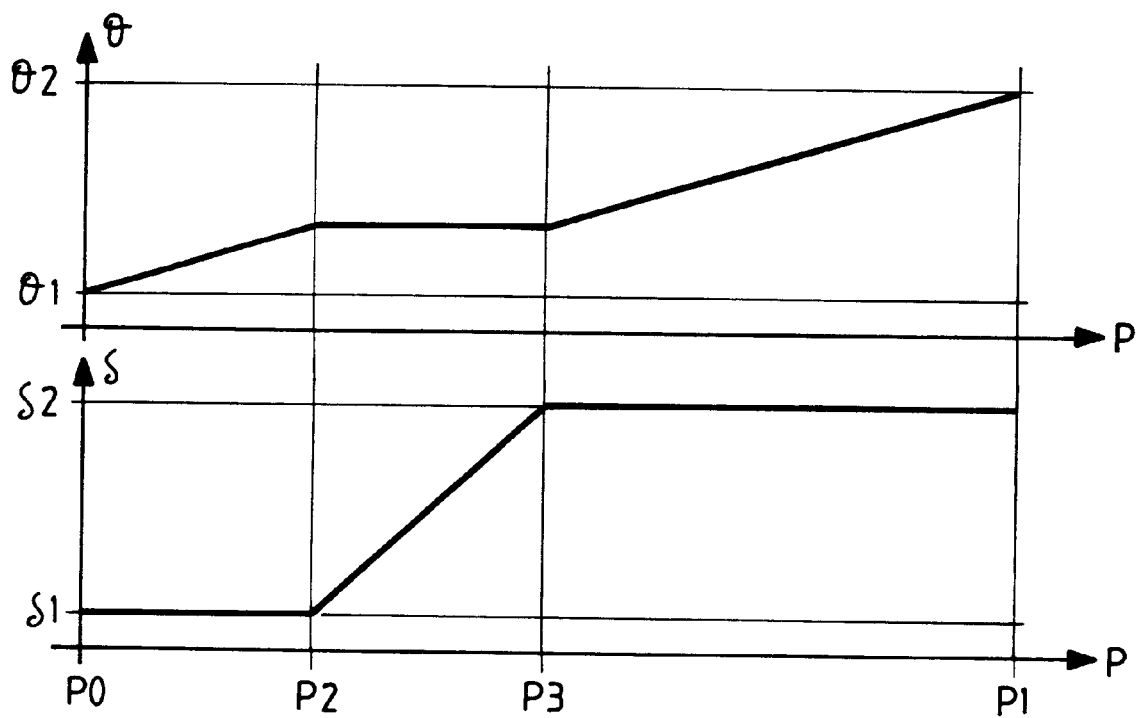
FIG. 2 is a graphical illustration of the control of a fin flap and of a countertorque rotor as a function of the operation of a rudder bar, representing said first embodiment.

It is assumed that no forces are returned from the fin flap D or from the rotor R2 (by the use of servo-controls for example). The control from the rudder bar 3 is therefore split between the fin flap D and the rotor R2 as a function of the moment equilibrium of the bellcrank 5, as illustrated in FIG. 2.

In this FIG. 2, two sets of abscissa and ordinates axes have been drawn one below the other so that they tally with each other. The first of these systems has, on the ordinates axis, the control command $\Theta$ for the rotor R2 and, on the abscissa axis, the position P of the rudder bar 3 between its extreme positions P0 and P1. The second system of axes has, on the ordinates axis, the turning angle $\delta$ of the fin flap D and, on the abscissa axis, likewise the position P of the rudder bar 3.

The values $\Theta 1$ and $\Theta 2$ and $\delta 1$ and $\delta 2$ correspond to the stop values of the rotor R2 and of the fin flap D, respectively.

When the fin flap D is not against a stop, that is to say when the rudder bar 3 is between positions P2 and P3, movement of the linkage 2 causes only the link rod 7 to move, via the bellcranks 5 and 6, and therefore a change in the turning angle $\delta$, because the spring 10 then keeps the link rod 8 in its neutral point.

By contrast, when said fin flap D reaches one of its stops, the turning angle $\delta$ then being equal to $\delta 1$ or $\delta 2$, the link rod 7 is immobilized and the additional actuations of the rudder bar 3 are transmitted to the link rod 8, as can be seen for the domains P0–P2 and P3–P1 of the position P of the rudder bar 3.

This very simple device 1A therefore allows the desired objective to be attained by giving priority to the fin flap D.

It will also be noted that:

- at high speed, the fin flap D has all the effectiveness it needs. It provides all the control, the rotor R2 remaining at zero thrust, this making it possible to improve the performance of the helicopter He; and
- at low speed, with power, as the countertorque effect needed cannot be provided by the fin flap D, because it is not effective enough under these conditions, the fin flap D will remain against the stop and all the control will be provided by the rotor R2.

Said device 1A also thus has the following advantages in particular:

- a substantial reduction in noise;
- yaw control authority at every point in the flight envelope;
- good lateral static stability;
- good feedback of the control margins because the position of the rudder bar 3 is truly representative of the control margin available and even, in the case of extreme positions, of the margin available on the auxiliary countertorque rotor R2;
- yaw control which can be performed by the fin flap D if there is a breakdown with the rotor R2. Indeed, in the event of such a breakdown, and as long as the helicopter He maintains sufficient speed, the device 1A will allow the helicopter to return to a favorable area and make a running (sliding) landing under good conditions.

However, for the embodiment depicted in FIG. 1, there arises, in low-speed flight, without power, a dead control range between the aforementioned positions P2 and P3. This is because the effectiveness of the fin flap D is then very low and most of the countertorque action is produced by the rotor R2. Now, if the rudder bar 3 is operated from a position between P0 and P2 toward a position between P3 and P1, or vice versa, the fin flap D is moved from one of its stops to the other between P2 and P3, without a significant countertorque action being generated.

A first solution for overcoming this problem of the dead control range is to move the neutral point (which is adjustable) of the spring 10 toward one of the ends.

Figure 3:
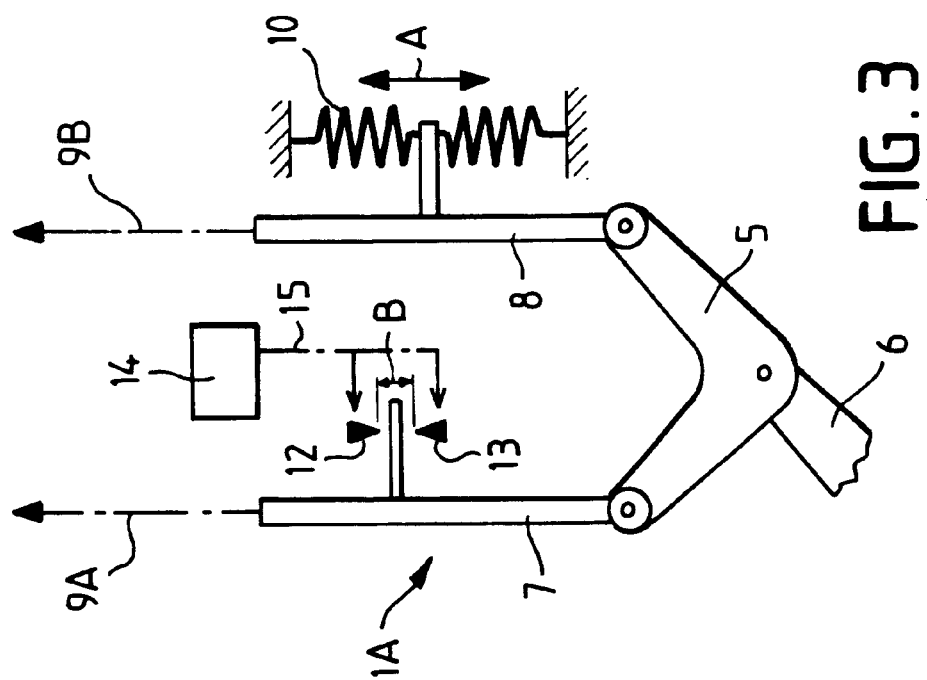
FIG. 3 shows diagrammatically a first refinement of the device of FIG. 1.

A second, particularly advantageous, solution depicted in FIG. 3 is to provide stops 12, 13 which are adjustable (as illustrated by a double-headed arrow B) for the fin flap D and which are associated, for example, with the link rod 7.

The device 1A then additionally comprises a means 14 for adjusting said stops 12 and 13, as illustrated by an arrow 15, particularly as a function of the speed of the helicopter He.

According to the invention, the stops 12 and 13 are brought closer to one another when the speed of the helicopter He drops, so as to reduce, at low speed, the difference between the angles $\delta 1$ and $\delta 2$ and therefore reduce the aforementioned dead range.

It is of course conceivable for the link rod 7 to be immobilized at very low speed so that the operation of the rudder bar 3 is then fully and exclusively transmitted to the rotor R2.

Figure 4:
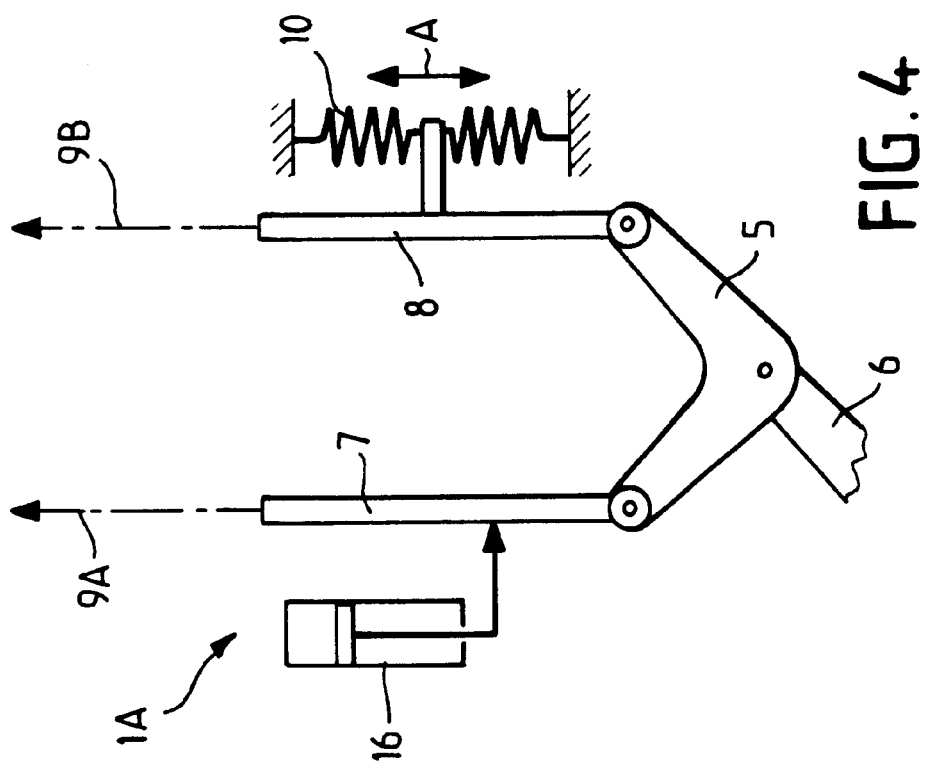
FIG. 4 shows diagrammatically a second refinement of the device of FIG. 1.

A third solution for overcoming the problem of the dead control range, in hovering flight, is depicted in FIG. 4. It consists in mounting a damper 16 in parallel with the control of the fin flap D.

Thus, in this embodiment, operation of the rudder bar 3 is associated with resistance in the two branches 5A and 5B of the bellcrank 5: one generated by the spring 10 and the other by the damper 16.

Through an appropriate choice of technical characteristics for said spring 10 and said damper 16, the device 1A can allow the control to be transmitted first to the rotor R2 and for there then to be a slow transfer of control from the rotor R2 to the fin flap D. This then gives a filtering system which allows steering (high frequencies) to be performed by the rotor R2 and equilibrium (low frequencies) to be performed by giving priority to the fin flap D.

Furthermore, as can be seen in FIG. 5, the second embodiment 1B of the invention comprises control means which comprise, in particular, a calculation unit 18 which determines:

- a control command $\delta c$ transmitted to a member, not depicted, for operating the fin flap D, to control the latter, as indicated by the arrow 9A; and
- a control command $\Theta c$ transmitted to a member, not depicted, for operating the rotor R2, to control the latter, as indicated by the arrow 9B, so that the combined action of said fin flap D and said rotor R2 represents the command for controlling the helicopter He in terms of yaw.

Of course, said yaw control command may be obtained directly by operating the rudder bar 3 of the helicopter He, as in the embodiment described earlier.

However, this second embodiment 1B of the invention is particularly applicable to a helicopter He which comprises a calculation unit 19, for example a fly-by-wire system, which determines the yaw control command on the basis of information received from links 20 and 21 and which represent the operation of the rudder bar 3 and of a collective stick 22, respectively, of the helicopter He and which transmits this yaw control command via a link 23 to the calculation unit 18.

Of course, the calculation unit 18 depicted as being independent in FIG. 5, may also be incorporated into the calculation unit 19.

Figure 6:
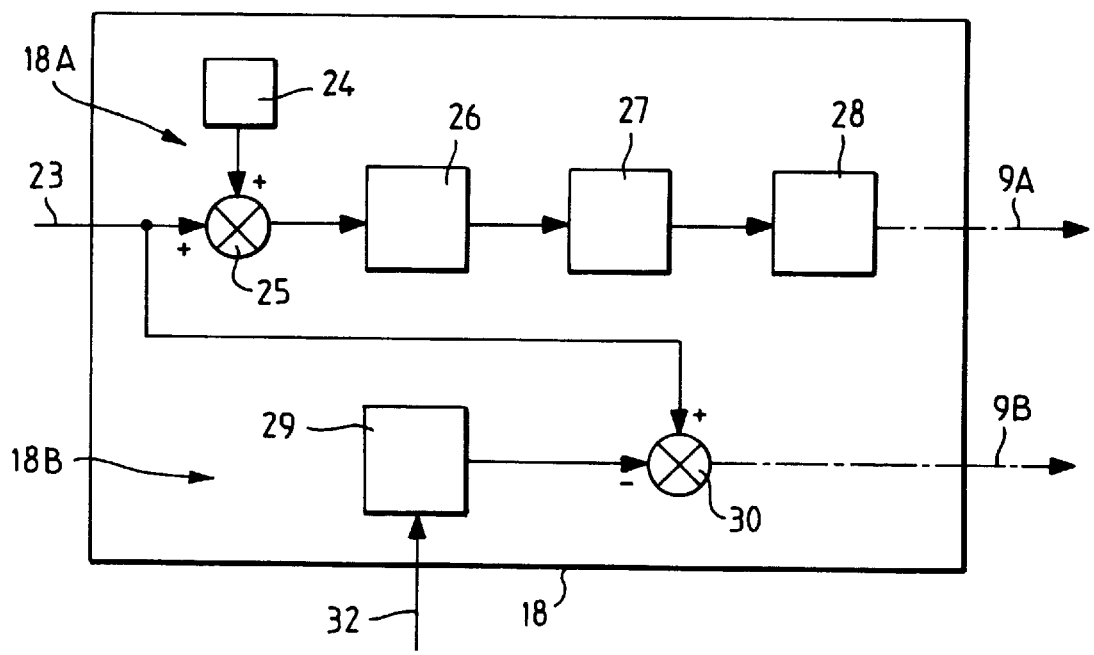
FIG. 6 is the block diagram of a calculation unit of the device of FIG. 5.

Said calculation unit 18 comprises, as depicted in FIG. 6:
- a first calculation sequence 18A for determining the control command δc; and
- a second calculation sequence 18B for determining the control command δc.

Said first calculation sequence 18A comprises, in succession:
- a calculation means 24 for determining a reference command, for example on the basis of characteristic parameters of the helicopter He, such as its speed or its altitude. Said reference command, by definition, represents a reference control of the rotor R2;
- a summer 25 which sums said reference command with the yaw control command received by the link 23;
- a calculation means 26 for converting said sum, which corresponds to a control command for the rotor R2, into an equivalent command for controlling the fin flap D. This conversion is achieved by multiplying said sum by a yaw-moment effectiveness conversion gain, of a known type;
- a low-pass filter 27 which filters the command thus calculated, because the fin flap D fulfills only a static function; and
- a calculation means 28 for limiting the command to the δc value that can be executed by said fin flap D and transmitted thereto.

As to the calculation sequence 18B, it comprises:
- a calculation means 29 for converting a measured, and specified hereinbelow, value of the turning angle of the fin flap D into a corrective control command for the rotor R2. This conversion is performed by dividing said measured value by the aforementioned yaw-moment effectiveness conversion gain; and
- a subtractor 30 which subtracts said corrective control command from the yaw control command so as to obtain the command Θc transmitted to the rotor R2.

The device 1B in accordance with the invention further comprises a measuring means 31 connected by a link 32 to the calculation means 29, for measuring the turning angle of the fin flap D. This measuring means 31 may also allow a breakdown in an actuator of the fin flap D to be detected, thus improving safety.

In an alternative form of the invention, it is possible to dispense with said measuring means 31 and to determine the value of the turning angle differently, for example by assuming that the actual position of the fin flap D corresponds to the position demanded.

This device 1B therefore also, in equilibrium, provides the desired split in control between the fin flap D and the rotor R2.

Of course, in one particular embodiment, the reference command may correspond to the command generating zero thrust from the rotor R2, in order then to obtain a situation which, as far as the objectives are concerned, is similar to the situation of the embodiment 1A.

It will also be noted that the control law employed by the calculation unit 18 is robust in the face of variations in the external aerodynamic configuration, and therefore requires little in-flight optimization. This is true of each of the embodiments, 1A and 1B.

Said device 1B additionally has the following advantages:
- it is transparent to upstream controls, that is to say that the action of the fin flap D does not alter the sensations upstream in the control sequence. The overall effectiveness remains identical to the scenario in which the fin flap D is not active. Said device 1B therefore requires no modifications or adjustments to the control laws upstream of it;
- the action of the fin flap D generates no disturbance in the control sequence; and
- the control thus achieved is also, in principle, valid in the windmilling scenario. The countertorque action of the fin, which is needless and unfavorable in such a scenario, is actually canceled in equilibrium.

What is claimed is:

1. An apparatus for controlling a hybrid countertorque system of a helicopter (He), said hybrid countertorque system being intended to counteract the torque induced by a main rotor (R1) providing the helicopter (He) with forward propulsion and lift, said apparatus comprising:
   - an auxiliary countertorque rotor (R2) which is controllable and which exerts a lateral countertorque thrust;
   - a non-rotting rudder component having at least one movable aerodynamic steering surface (D) which has a movable position and which may generate a variable amount of transverse countertorque lift depending on said movable position;
   - a control system that controls said movable position of said aerodynamic surface (D), said control system controlling, as a matter of priority, said movable position of said aerodynamic surface (D) to generate said variable amount of transverse countertorque which represents at least part of a first control command, said control system controlling said auxiliary rotor (R2) so that the combined action of said aerodynamic surface (D) and said auxiliary rotor (R2) represents a command for controlling the helicopter (He) in terms of yaw; and
   - at least one rudder bar (3) for controlling the helicopter (He) in terms of yaw and a linkage (2) connected to said rudder bar (3) and to a member for operating the auxiliary rotor (R2), wherein said control system (IA) comprises a bellcrank (5) with two branches (5A, 5B) incorporated into said linkage (2) and intended to split the movement of the linkage (2) between said branches (5A, 5B), wherein a first (5A) of said branches is connected mechanically to a member for operating the aerodynamic surface (D), and wherein a second (5B) of said branches is mechanically connected to the member for operating the auxiliary rotor (R2), the mechanical link (8) between said second branch (5B) and said member for operating the auxiliary rotor (R2) being elastically constrained.

2. The apparatus as claimed in claim 1, comprising an elastic constraint (10) that has a neutral point which is adjustable.

3. The apparatus as claimed in claim 1, which comprises adjustable stops (12, 13) limiting the movement of the mechanical link (7) between the first branch (5A) of the bellcrank (5) and the member for operating the aerodynamic surface (D).

4. The apparatus as claimed in claim 3, which comprises means (14) for adjusting said stops (12, 13) as a function of the speed of the helicopter (He).

5. The apparatus as claimed in claim 1, which comprises a damper (16) connected to a mechanical link (7) between the first branch (5A) of the bellcrank (5) and the member for operating the aerodynamic surface (D).

6. An apparatus for controlling a hybrid countertorque system of a helicopter (He), said hybrid countertorque system being intended to counteract the torque induced by a main rotor (R1) providing the helicopter (He) with forward propulsion and lift, said apparatus comprising:

an auxiliary countertorque rotor (R2) which is controllable and which exerts a lateral countertorque thrust;

a non-rotating rudder component having at least one movable aerodynamic steering surface (D) which has a movable position and which may generate a variable amount of transverse countertorque lift depending on said movable position;

a rudder bar (3); and a control system that controls said movable position of said aerodynamicsurface (D) and said auxiliary rotor (R2) in response to a yaw control command generated at least in part by movement of said rudder bar (3), said control system controlling said movable position of said aerodynamic surface (D) as a matter of priority over said auxiliary rotor (R2), said control system comprising:

a calculation unit (19) that generates said yaw control command; and a calculation unit (18) that receives said yaw control command from said calculation unit (19), said calculation unit (18) generating a first control command for controlling said movable position of said aerodynamic surface (D) based on said yaw control command and a second control command for controlling said auxiliary rotor (R2) based on said yaw control command, said first control command being limited to a limit value based on a turning capability of said aerodynamic surface (D) and said second control command being based on said movable position of said aerodynamic surface (D) and said yaw control command, so that said aerodynamic surface (D) is controlled as a matter of priority over said auxiliary rotor (R2).

7. The apparatus as claimed in claim 6, wherein said first control command is determined on the basis of the difference between said yaw control command and a reference command that represents a reference control of said auxiliary rotor (R2).

8. The apparatus as claimed in claim 6, additionally comprising a stick (22), wherein said yaw control command is generated on the basis of the actions exerted respectively on said stick (22) and said rudder bar (3) by at least one pilot of the helicopter (He).

9. The apparatus as claimed in claim 6, wherein said calculation unit (18) performs a conversion between said first and second control commands using a yaw-moment effectiveness conversion gain.

10. The apparatus as claimed in claim 6, wherein said calculation unit (18) performs low-pass filtering of said first control command.

11. The apparatus as claimed in claim 6, additionally comprising means (31) for measuring a turning angle of said aerodynamic surface (D) and transmitting a signal indicative of said turning angle to said calculation unit (18).

12. The apparatus as claimed in claim 6, additionally comprising a calculation means (24) for calculating said reference command.

13. A helicopter which includes the apparatus specified in claim 6.

* * * * *